(No Model.)

A. DE V. GARNER.
BANK CHECK, DRAFT, &c.

No. 485,925. Patented Nov. 8, 1892.

*Fig. 1*

| WASHINGTON, D.C. May 27th 1892 No. 711 |
| --- |
| NATIONAL BANK |
| Pay to the order of John Doe  $25,378 29/100 |

| Two | Five | Three | Seven | Eight 29/100 | DOLLARS |
|---|---|---|---|---|---|
| HUNDRED THOUSAND | TEN THOUSAND | THOUSANDS | HUNDREDS | TENS | UNITS / FRACTIONAL |

*Fig. 2*

(Richard Roe signature)

*Fig. 3*

NATIONAL BANK of WASHINGTON, D.C.
No. 71144   WASHINGTON, D.C. May 27th 1892
Pay to the order of John Doe   $25,378 29/100

| Two | Five | Three | Seven | Eight 29/100 | DOLLARS |
|---|---|---|---|---|---|
| HUNDRED THOUSAND | TEN THOUSAND | THOUSANDS | HUNDREDS | TENS | UNITS / FRACTIONAL |

To THE NATIONAL BANK of NEW YORK

*Fig. 4*

(Richard Roe Cashier signature)

*Fig. 5*

No. 711   WASHINGTON D.C. May 27 1892
NATIONAL BANK

| Two | Five | Three | Seven | Eight 29/100 | $25,378 29/100 |
|---|---|---|---|---|---|
| HUNDRED THOUSAND | TEN THOUSAND | THOUSANDS | HUNDREDS | TENS | UNITS / FRACTIONAL DOLLARS |

*Fig. 6*

Pay to the order of — John Doe — Richard Roe — Pay to the order of Henry Smith — Pay to the order of John Doe — Pay to the order of William Jones — Henry Smith — Pay to the order of x   y Witnesses
J. D. Kingsbury
J. Mawdsley Inventor
Aubrey DeVere Garner,
By
Whitaker & Prevost Attorneys

UNITED STATES PATENT OFFICE.

AUBREY DE-VERE GARNER, OF LANSING, MICHIGAN.

BANK CHECK, DRAFT, &c.

SPECIFICATION forming part of Letters Patent No. 485,925, dated November 8, 1892.

Application filed June 6, 1892. Serial No. 435,761. (No specimens.)

*To all whom it may concern:*

Be it known that I, AUBREY DE-VERE GARNER, a citizen of the United States, residing at Lansing, in the county of Ingham and State of Michigan, have invented certain new and useful Improvements in Bank Checks, Drafts, Money-Orders, Notes, Bills, Receipts, &c.; and I do hereby declare the following to be a full, clear, and exact description of the invention, such as will enable others skilled in the art to which it appertains to make and use the same.

My invention is an improvement in checks, drafts, &c.; and it consists in the novel features hereinafter fully described.

In the accompanying drawings I have shown my invention applied to checks and drafts, and said invention is fully disclosed in the following description and claims.

Referring to said drawings, Figure 1 is a view of the face of a check embodying my invention. Fig. 2 is a view of the back of the same. Figs. 3 and 4 are respectively a face and back view of a bank-draft made in accordance with my invention. Figs. 5 and 6 are respectively a face and back view of a slightly-modified form of check.

The object of my invention is to obtain greater security in the use of checks, drafts, &c., from "raising," "scratching," and other fraudulent manipulating. It frequently happens that bank checks and drafts of the forms now in general use fall into the hands of dishonest persons, who by erasure or by acids erase certain figures and substitute others or add figures, or, in other words, increase the amount of the check, and great frauds are often perpetrated in this way.

In the form of check shown in Figs. 1 and 2 the lower half of the check is divided into columns, which are lettered, respectively, from units to hundreds of thousands or higher, if desired. For convenience, a single column will suffice for units and fractions, as shown. A blank space is left in each column above (or below) the lettered title in which to write the word which represents the figure standing in each place in the amount for which the check is filled out. In the check shown in the drawings the amount is "$25,378.29." In filling in the check the word "Two" is written in the column marked "Ten thousands," the word "Five" is inscribed in the "Thousands" column, "Three" in "Hundreds," "Seven" in "Tens," and "Eight and $\frac{29}{100}$" in the "Units and fractional." The amount is also placed in figures following the dollar-mark, as usual. If it is attempted to "raise" this check, it is not enough to change a figure of the number, but the word in the corresponding column must also be changed to correspond. This can only be done by a knife or by acids. The signature of the drawer of the check is placed not on the face, but on the back of the check, on the face of which the number of the highest order of units is written, and the back of the check is provided with positive indications for the signature of the drawer, which may consist of dotted lines or lightly-printed words of instruction to indicate where the drawer is to sign, or the columns for the orders of units may be indicated by dotted lines or otherwise upon the back, in order that the signature may be readily placed back of the highest order of the sum written on the face of the check. In this instance the signature of the check is directly in rear of the word "Two" in the "Ten-thousands" column, as shown in Fig. 2. It will thus be seen that any attempt to change the highest number of the check (which is the one most generally altered) will injure or efface the signature of the drawer, and thus lead to detection. If the person attempting to raise the check fills in a number in advance of the highest figure and fills in the space in the corresponding column, it will be detected at once, for when the cashier comes to pay the check he can see at a glance that the drawer's signature is not behind the highest number on the check and will thus be informed that the check has been raised.

In Figs. 3 and 4 I have shown a bank-draft made in accordance with my invention, in which the signature of the cashier is placed on the back directly over the word standing for the highest figure of the sum which is the amount of the check. In Figs. 5 and 6 I have shown a slightly-modified form of check, in which the words "Pay to the order of" are printed on the back instead of on the face of the check in several places, so that a signature may be placed beneath any one, so as to be just back of one of the places for the numbers on the face. The drawer will write in the drawee's name and sign his own beneath one of these expressions, so that his signature shall be just back of the highest-written number on the face of the check, as in the other forms just described. The indorsers can fill in the names of their indorsees and signatures below the succeeding lines of printing, as shown at x and y in Fig. 6, so that the name of the first indorser shall be back of the second word of the number and that of the second indorser shall be back of the third word, &c.

By the use of my improved check or draft it will be seen that a great deal of the danger of fraudulent manipulating will be avoided and such practices will be more readily detected.

What I claim, and desire to secure by Letters Patent, is—

1. A bank check or draft having positive indications for the signature of the drawer back of the highest number of the amount written upon its face, substantially as described.

2. A bank check or draft having upon its face spaces corresponding to the several orders of units and having indications upon the back for the signature of the drawer back of each of said spaces, whereby the signature of the drawer may be placed back of the space corresponding to the highest number of the amount written on the face, substantially as described.

In testimony whereof I affix my signature in presence of two witnesses.

AUBREY DE-VERE GARNER.

Witnesses:
 TERRY J. DAVIS,
 DENNIS P. QUINLAN.